United States Patent
Blum et al.

(10) Patent No.: US 7,744,727 B2
(45) Date of Patent: Jun. 29, 2010

(54) DISTILLATION METHOD

(75) Inventors: Stephan Rüdiger Blum, Calgary (CA); Bernhard Kaiser, Merzenich (DE)

(73) Assignees: 2S-Sophisticated Systems Limited, London (GB); Buss-SMS-Canzler GmbH, Butzbach (DE)

( * ) Notice: Subject to any disclaimer, the term of this patent is extended or adjusted under 35 U.S.C. 154(b) by 897 days.

(21) Appl. No.: 10/553,662

(22) PCT Filed: Apr. 24, 2004

(86) PCT No.: PCT/DE2004/000867

§ 371 (c)(1),
(2), (4) Date: Aug. 21, 2006

(87) PCT Pub. No.: WO2004/096403

PCT Pub. Date: Nov. 11, 2004

(65) Prior Publication Data

US 2007/0131533 A1 Jun. 14, 2007

(30) Foreign Application Priority Data

Apr. 25, 2003 (DE) .................. 103 19 046

(51) Int. Cl.
B01D 3/14 (2006.01)
B01D 61/36 (2006.01)
B01D 61/58 (2006.01)
C12G 3/12 (2006.01)

(52) U.S. Cl. .............. 203/19; 203/27; 203/74; 203/81; 203/DIG. 9; 203/DIG. 16; 210/641; 210/664; 210/774; 426/494; 568/913; 568/916; 159/DIG. 27; 159/DIG. 28

(58) Field of Classification Search ............. 203/1, 203/3, 19, 23, 27, 74, 75, 81, 82, 84, DIG. 8, 203/DIG. 9, DIG. 16; 210/641, 664, 774, 210/790; 426/494; 568/913, 916; 159/DIG. 27, 159/DIG. 28; 435/161

See application file for complete search history.

(56) References Cited

U.S. PATENT DOCUMENTS

| 2,970,106 A | * | 1/1961 | Binning et al. ............... 208/347 |
| 2,981,680 A | * | 4/1961 | Binning ....................... 210/640 |
| 4,405,409 A | * | 9/1983 | Tusel et al. .................. 202/200 |
| 4,812,232 A | * | 3/1989 | Weiss .......................... 210/181 |

(Continued)

FOREIGN PATENT DOCUMENTS

DE           41 37 572           8/1992

(Continued)

OTHER PUBLICATIONS

International Search Report dated Sep. 23, 2004, issued for the corresponding International Application No. PCT/DE2004/000867.

*Primary Examiner*—Virginia Manoharan
(74) *Attorney, Agent, or Firm*—Cohen Pontani Lieberman & Pavane LLP

(57) ABSTRACT

A method for distilling ethanol from a mash includes feeding a fluid to a first distillation column. The fluid and a distillate of the first distillation column are delivered to a second distillation column. The fed fluid and/or distillate of the second distillation column is/are purified in a first and/or last step of the method by a membrane separation process.

20 Claims, 3 Drawing Sheets

U.S. PATENT DOCUMENTS

| | | | |
|---|---|---|---|
| 4,844,932 A | * | 7/1989 | Daoud ........................ 426/489 |
| 4,900,402 A | * | 2/1990 | Kaschemekat et al. ........ 203/19 |
| 5,143,526 A | | 9/1992 | Lee et al. |
| 5,177,008 A | * | 1/1993 | Kampen ..................... 435/139 |
| 5,480,665 A | | 1/1996 | Smith |
| 2004/0000473 A1 | | 1/2004 | Hofen et al. |
| 2008/0135396 A1 | * | 6/2008 | Blum ......................... 203/25 |

FOREIGN PATENT DOCUMENTS

| | | |
|---|---|---|
| DE | 43 02 030 | 3/1994 |
| FR | 2 743 069 | 7/1997 |
| WO | WO 01/10540 | 2/2001 |

* cited by examiner

|  |  | 1 | 2 | 3 | 4 | 5 | 6 | 7 | 8 | 9 | 10 |
|---|---|---|---|---|---|---|---|---|---|---|---|
| VOLUME FLOW | kg/h | 12,000 | 8,955 | 3,045 | 2,955 | 6,000 | 6,000 | 1,842 | 4,798 | 1,202 | 640 |
| ETHANOL | wt.% | 10 | 9.8 | 10.5 | 30 | 0 | 20 | 85 | 0 | 99.8 | 57.2 |
| WATER | wt.% | 85 | 83.5 | 89.5 | 70 | 90 | 80 | 15 | 100 | 0.2 | 42.8 |
| MASH | wt.% | 5 | 6.7 | 0 | 0 | 10 | 0 | 0 | 0 | 0 | 0 |
| PRESSURE | barA | 1.013 | 2.5 | 2.5 | 2.5 | 2.5 | 2.5 | 2.5 | 1.013 | 1.013 | 0.1 |
| TEMPERATURE | °C | 20 | 30 | 30 | 120 | 120 | 120 | 125 | 30 | 25 | 120 |

Table 1

|  |  | 31 | 32 | 33 | 34 | 35 | 36 | 37 | 38 | 39 | 40 |
|---|---|---|---|---|---|---|---|---|---|---|---|
| VOLUME FLOW | kg/h | 12,000 | 8,955 | 3,045 | 2,955 | 6,000 | 6,000 | 1,842 | 4,798 | 1,202 | 640 |
| ETHANOL | wt.% | 10 | 9.8 | 10.5 | 30 | 0 | 20 | 85 | 0 | 99.8 | 57.2 |
| WATER | wt.% | 85 | 83.5 | 89.5 | 70 | 90 | 80 | 15 | 100 | 0.2 | 42.8 |
| MASH | wt.% | 5 | 6.7 | 0 | 0 | 10 | 0 | 0 | 0 | 0 | 0 |
| PRESSURE | barA | 1.013 | 3 | 3 | 3 | 1.013 | 3 | 3 | 1.013 | 1.013 | 0.1 |
| TEMPERATURE | °C | 20 | 115 | 30 | 120 | 30 | 120 | 125 | 50 | 30 | 120 |

Table 2

DISTILLATION METHOD

CROSS-REFERENCE TO RELATED APPLICATION

This is a U.S. national stage of International Application No. PCT/DE2004/000867, filed Apr. 24, 2004, which claims priority of German Application No. 103 19 046.5, filed Apr. 25, 2003.

BACKGROUND OF THE INVENTION

1. Field of the Invention

The invention relates to a method of distillation, especially of ethanol from a mash.

2. Description of the Related Art

In a conventional method of distillation and dehydration of ethanol from a beer mash, which contains about 10% ethanol, 85% water, and 5% solids, the mash is preheated and fed into a first distillation column. In the first distillation column, the mash is concentrated by evaporation, and the solids are removed as a bottom product together with water. A portion of the bottom product is usually returned to the distillation column after heating (reboiler).

The first distillate in the form of a vapor, which still contains water, ethanol, and fusel oils, is fed, possibly via a collecting and mixing tank, into a second distillation column, which is designed as a rectifying column. A more extensive separation is carried out in this rectifying column, and the fusel oils are removed in a sidestream. Of the water separated as bottom product in the second distillation column, a small fraction is returned to the rectifying column after heating (reboiler), and the remainder is removed, so that it is eliminated from the production process. The distillate of the second distillation column, which, as before, contains water and ethanol, can be partly returned to the first and second distillation columns, possibly via the aforementioned collecting tank.

Most of the ethanol/water mixture that constitutes the second distillate and contains about 95% ethanol and 5% water is subjected to a final dehydration, which yields ethanol that is as pure as possible with a purity of 99 to 99.8%. This last dehydration is carried out with molecular sieves, in which crystalline zeolites adsorb $H_2O$ molecules like a sponge.

However, the zeolites of a molecular sieve quickly become saturated with water. Therefore, the water-saturated zeolites must be regenerated to achieve constant dehydration. Consequently, molecular sieves are usually used in pairs. Highly pure ethanol can then be made available by a first, active molecular sieve, and this ethanol can also be used for regenerating a second, passive molecular sieve. In the regeneration of a passive molecular sieve, the ethanol used for this purpose can be returned to a distillation column, and this return flow can amount to about 30% of the pure ethanol obtained from the active molecular sieve. In this process, the constant change of the pressure load of the molecular sieves causes dust-like abrasion of the filler material. This loads downstream stages of the installation, which must be completely replaced on a periodic basis. This has unfavorable consequences for capital expenditures and operating costs.

The dehydration of ethanol is an energy-intensive process. Especially the concentration of the mash by evaporation in the first distillation column and the necessity of large amounts of distillate reflux result in considerable operating costs and capital expenditures. In addition, it is necessary to achieve a high degree of purity of the ethanol/water mixture of about 90-95% before a treatment with molecular sieves can be carried out, so that the mixture of substances must be rectified to bring it as close as possible to the azeotropic point, which results in very high equipment expense and operating costs. Consequently, a large number of separating stages and a high level of reflux are necessary in the rectifying column.

SUMMARY OF THE INVENTION

Proceeding from this technical background, an object of the invention is to develop a distillation method that significantly improves the economy of the process, especially with respect to the dehydration of ethanol from a mash.

To solve this technical problem, a method of distillation, especially of ethanol from a mash, is proposed, in which feed is supplied to a First distillation column (often referred to as a stripper), and a distillate of the first distillation column is fed into a second distillation column (a rectifying column), and which is characterized by the fact that in a first and/or last process step, the feed and/or a distillate of the second distillation column is purified by a membrane separation process.

Many different membrane separation processes are known and have been proven effective. Advantageously, no phase changes of the treated product occur in most membrane separation processes during the separation, and no quantities of latent energy from this source are moved. Furthermore, the membranes themselves are inert even towards the components of the mixture of substances, so there is no additional contamination by material separating aids in the product. This also eliminates the need for a subsequent purification of the product by removal of these contaminating separating aids. In addition, regeneration of separation devices of this type is unnecessary.

Preferred membrane separation processes are the so-called membrane processes, and of these, membrane filtration is preferably used, especially for a treatment of the feed, especially a beer mash, in the production of ethanol. This membrane filtration, e.g., of the mash, then makes available a purely liquid ethanol/water/fusel oil mixture as the permeate. The remaining retentate with an increased mash slurry fraction is preferably preheated and then fed into the first distillation column in the usual way.

Dynamic crossflow membrane filtration can be used in an advantageous way. In this technique, membrane disks are mounted on rotating hollow shafts, such that the membrane disks of the different shafts overlap. A product flows against the membrane disks from the outside, and the permeate permeates through the membrane to the inside of the disk and is removed through the hollow shaft. Membrane fouling or obstruction is significantly reduced by the relative speed between the disks and the product that is produced by the rotation of the disks and is further reduced by the high level of turbulence in the regions of the overlapping of membrane disks. This results in an increased specific permeate output and a reduced energy consumption per unit of permeate. In addition, the purification cycles are significantly longer than in other membrane processes, which increases the availability and reduces the operating costs.

The permeate of the membrane separation process of the feed bypasses the first distillation column and is fed directly into the second distillation column. Especially in the case of the production of ethanol from a beer mash, the permeate of the membrane separation process already has essentially the same composition as the distillate of the first distillation column. Accordingly, the permeate does not need to pass through the process step of the first distillation column and can be fed directly into the second distillation column.

This already results in considerable energy savings, since this permeate that is fed into the second distillation column no longer has to be completely evaporated by conventional methods in the first distillation column. This is the case especially when the quantitative ratio of the retentate to the permeate is between 1 and 8.

It is also an advantage from the chemical-engineering standpoint if the permeate of the membrane separation process of the feed is fed as a mixture with the first distillate into the second distillation column. This measure allows the second distillation column to be fed in an evenly controlled way, and discharge fluctuations of the first distillation column and the membrane separation process can be compensated. Alternatively, the permeate of the membrane separation process of the feed and the distillate of the first distillation column can each be fed separately into the second distillation column.

Depending on the design of the method of the invention, the mixture is fed as feed into the second distillation column, or the separately supplied permeate and/or distillate of the first distillation column is supplied to the second distillation column at a comparatively high temperature, for example, at a temperature of 120° C., but preferably the feed is present to the greatest possible extent in the liquid phase, in contrast to feed in the form of a vapor at the dew point in accordance with the prior art. This means that the mixture is maintained in the liquid state at the boiling point.

In the second distillation column, water in the liquid phase is removed at the bottom outlet. Therefore, the method of the invention further makes it possible for the water fraction of the permeate of the membrane separation process of the feed to remain in the liquid phase in the second distillation column. In the second distillation column, therefore, only evaporation of the ethanol fraction of the feed mixture is still required. Compared to conventional methods, the evaporation energy of the water fraction can be saved, since the water is no longer introduced into the second distillation column as a vapor phase but rather as a liquid phase and remains in the liquid phase there.

Depending on the choice of the membrane separation process, the amount of liquid fed to the first distillation column is reduced by 15-50% as compared to the prior art. Correspondingly less energy is required for evaporation of the amount introduced there.

Due to the measures explained above, a product with an already increased concentration of solids in the mash slurry is fed into the first distillation column. Despite the reduced amount of liquid in the feed of the first distillation column, the bottom concentration as well as the composition of the distillate are similar to conventional methods, but the concentration within the stripping column is higher.

The distillate of the second distillation column has an ethanol concentration of 75-95 wt. %. Even though the water concentration is still relatively high compared to conventional methods, which require an ethanol concentration of 90-95% before a final dehydration, in accordance with the invention, a final dehydration can be advantageously carried out by another membrane separation process, especially, once again, by a membrane process and, as is preferred here, by a vapor permeation. Consequently, the second distillation column can be inexpensively designed and operated.

It is advantageous to provide a group of parallel-connected membrane modules for the final dehydration, to which the distillate of the second distillation column (rectifying column) is preferably fed via a superheater. The retentate of this group of membrane modules, especially ethanol in this case, is made available as a highly pure final product with an ethanol concentration of more than 99%, and especially 99-99.95%.

The separating effect of the membrane modules can be increased if a small portion of a retentate of the membrane filter modules, which constitutes the final product, is fed back into each membrane filter module as a flushing stream for the permeate side. After it has flowed through, it is fed back with the permeate that forms into the second distillation column as a second feed stream.

The flushing stream split from the retentate of the membrane modules is permanently returned and lowers the partial pressure of the water on the permeate side, so that a further improved retentate purity of up to 99.95% can be economically achieved.

A flushing process of this type can be realized, as is preferred here, by the use of a so-called internal sweep stream in the form of a split stream of the retentate, or, alternatively, by an external sweep stream, e.g., a nitrogen stream. A common feature of both techniques is that the permeate is physically (convectively) discharged by an additional mass flow.

Since preferably vapor permeation takes place in the membrane modules, and the retentate that constitutes the final product is present as a gaseous phase, the introduction of the flushing stream in the gaseous phase is not a problem. This must also be seen in light of the fact that, after a throttle, the permeate vacuum takes hold, and thus the volume flow of the sweep stream increases sharply, which results in improved convective countercurrent discharge of the permeate.

Before being fed into the second distillation column, the permeate of the membrane modules can be advantageously heated by the heat of the bottom product removed from the second distillation column. Likewise, the heat of the final product and/or of a bottom product of the second distillation column can be used to preheat the retentate of the membrane separation process of the feed, which can normally be accomplished by means of standard heat exchangers.

A heat exchanger, especially a condenser, is also preferably provided in the feed line of the second distillation column, advantageously immediately before a feed inlet, for removing the heat that was introduced in the first distillation column for evaporation of the liquid but that is now excess heat.

BRIEF DESCRIPTION OF THE DRAWINGS

The method of the invention is explained in greater detail below with reference to the drawings, in which process sequences are only schematically illustrated.

Figure 1:
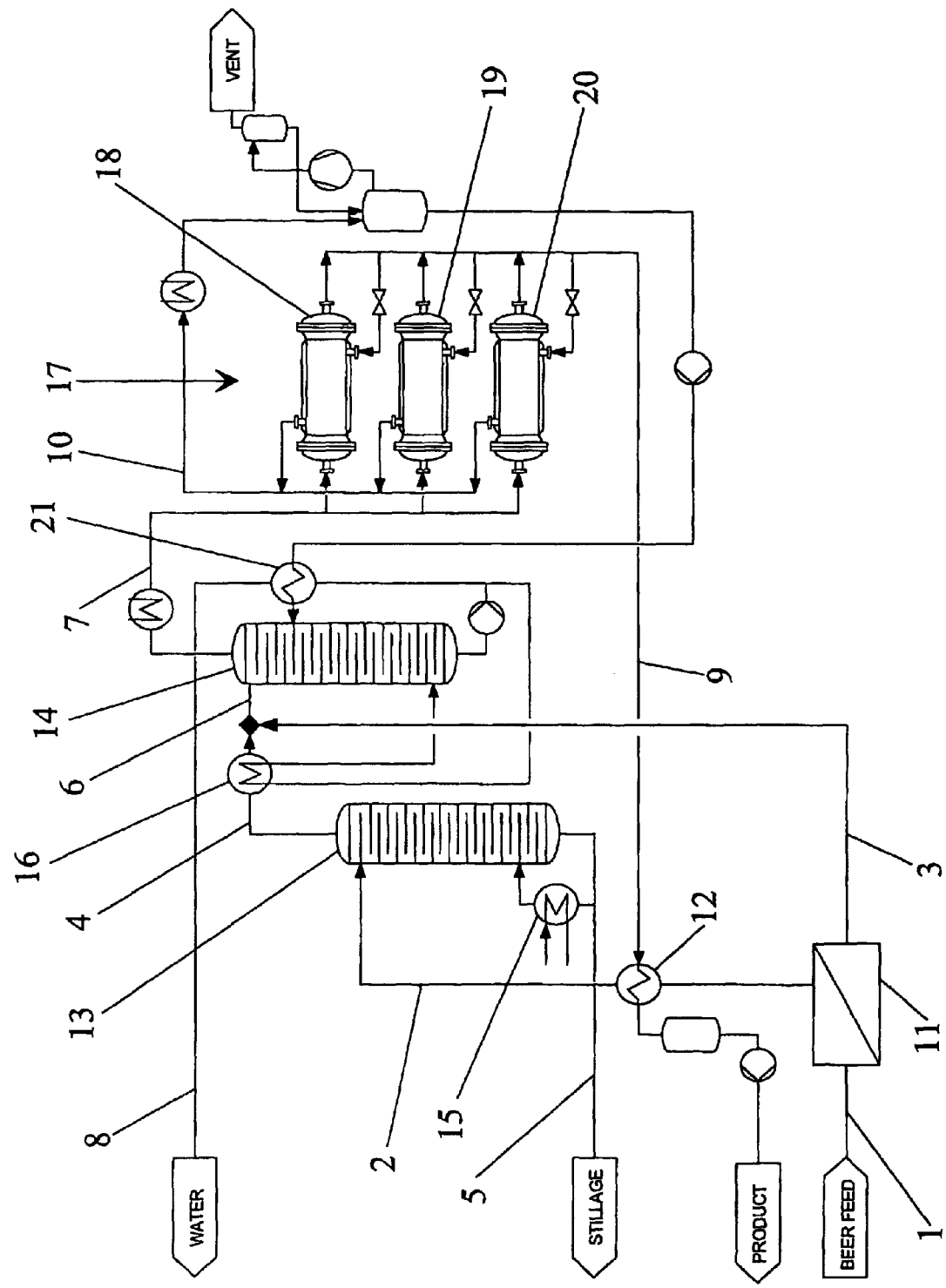
FIG. 1 shows a first process sequence.
Figure 2:
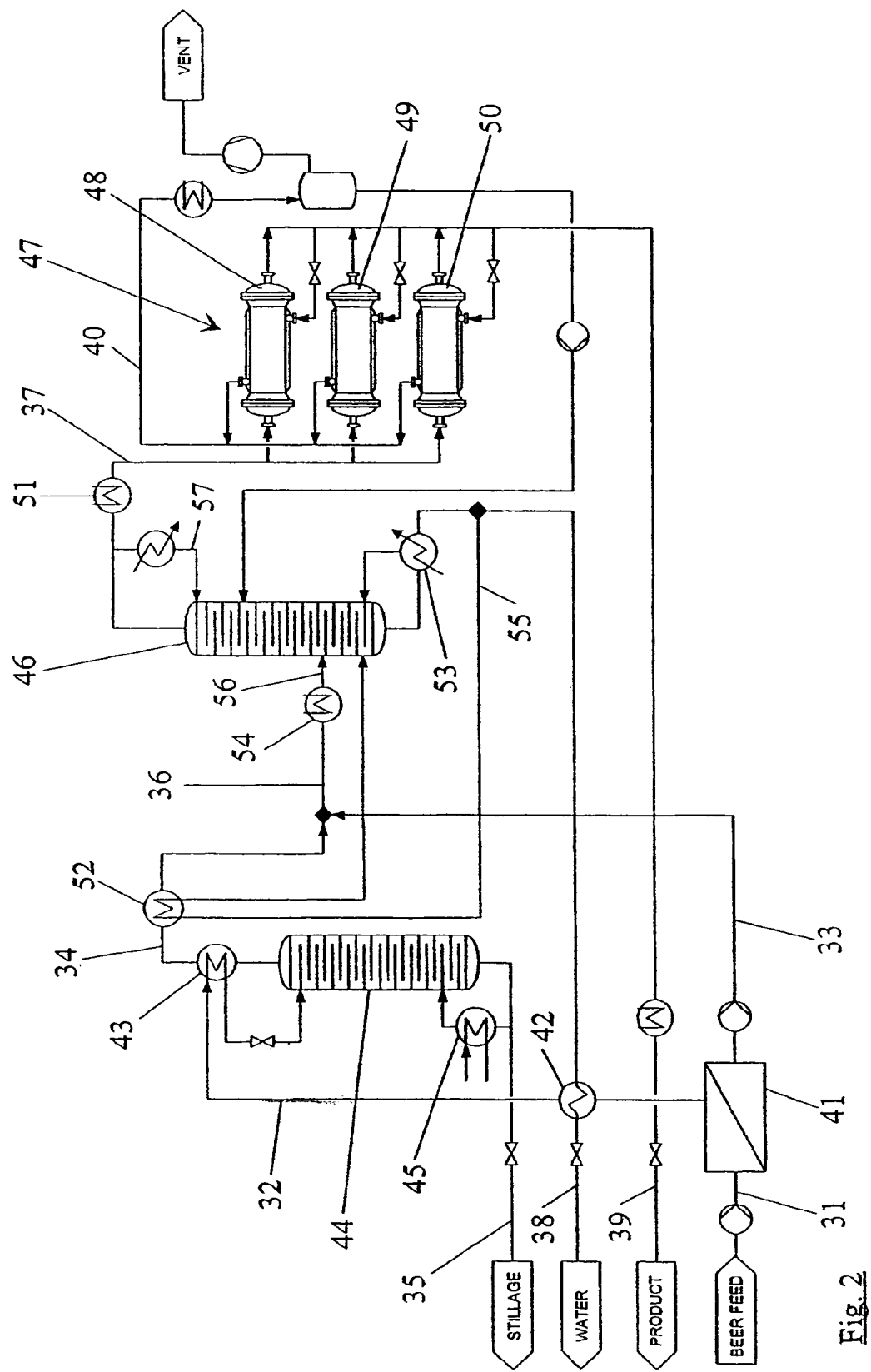
FIG. 2 shows a second process sequence.

Tables 1 and 2 following the drawings show the physical quantities, only as examples, found at the locations corresponding to reference numbers 1-10 and 31-40, wherein the processes according to FIGS. 1 and 2 differ essentially only in their different utilization of the available process heat.

DETAILED DESCRIPTION OF THE PRESENTLY PREFERRED EMBODIMENTS

FIG. 1 is a schematic representation of a system for the distillation and dehydration of ethanol from a feed beer mash (beer feed) 1.

The mash contains about 10 wt. % ethanol, 85 wt. % water, and 5 wt. % solids at a temperature of, e.g., 20° C. In a membrane separation station 11, the feed is separated into a retentate 2 with an increased mash slurry concentration and solids and a permeate 3, which consists of a mixture of water, ethanol, and fusel oil that is present exclusively as a liquid phase. The retentate 2 with an increased mash slurry concentration and solids is heated by a heat exchanger 12, e.g., by 10° C., to a temperature of 30° C. and fed into the first distillation column 13 or stripper.

The liquid permeate 3 of the membrane separation station 11 of the feed 1 is fed directly into a second distillation column 14, which is a rectifying column.

Since the retentate 2 introduced into the first distillation column 13 has an increased mash slurry concentration, the first distillation column 13 can be effectively operated, and complete evaporation of the permeate in the first distillation column 13 is unnecessary, but rather a separation into an ethanol/water mixture with an increased ethanol fraction is carried out there. Of this mixture, ultimately only the ethanol fraction must be evaporated, while water and solids that accumulate at the bottom are removed from the process as bottom product 5 (stillage).

A portion of the bottom product 5 can be returned to the first distillation column in the usual way after heating by a heat exchanger 15.

The distillate 4 of the first distillation column 13, which has an ethanol concentration of, e.g., 30%, is drawn off through a heat exchanger 16 and then mixed with the permeate 3. The mixture 6 is fed into the second distillation column 14 at a preferably constant volume flow. For example, this mixture 6 has an ethanol concentration of 20 wt. % and a water concentration of 80 wt. % at a temperature of 120° C. (see also the data in the tables). The mixture 6 preferably remains in the liquid phase at the boiling point.

The distillate 7 of the second distillation column 14 still has, for example, at a temperature of 125° C., an ethanol concentration of 85 wt. % and a water concentration of 15 wt. %. In the method of the invention, even at about 80 wt. % ethanol in the distillate 7 of the second distillation column 14, compared to the 90-95 wt. % ethanol that is necessary in conventional methods, a final dehydration can be carried out by a membrane separation process.

For this purpose, the distillate 7 of the second distillation column is fed to a group 17 of three (in the present example) parallel-connected membrane modules 18, 19, 20. The retentate 9 that emerges after the membrane filtration, especially a vapor permeation, constitutes the final product, namely, highly pure ethanol with a water concentration of only 0.2 wt. %, and possibly as low as 0.05 wt. %. After cooling through the heat exchanger 12 to preheat the retentate 2 that is being fed into the first distillation column 13, the final product (product) is available.

The membrane modules 18-20 can be operated in a sweep technique. For this purpose, a certain amount of the retentate 9 that constitutes the final product is returned to each of the membrane filter modules 18-20, through which it flows as a flushing stream. This portion of retentate is mixed with the permeate that forms to form a mixture 10, which has an ethanol concentration of, for example, 57.2 wt. % and a water concentration of 42.8%. The mixture 10 is condensed in a vacuum in a heat exchanger 21 and returned by a pump (not shown) and possibly via a collecting tank to the second distillation column 14 for separation. The heat exchanger 21 utilizes the waste heat of the water, which is the only bottom product 8 of the second distillation column 14 and is cooled, for example, to 30° C. by this heat exchange.

The method shown in FIG. 2 is used to carry out a distillation and dehydration of ethanol from a feed beer mash (beer feed) 31, which has the same composition as in the first embodiment.

A separation into a retentate 32 and a permeate 33 is carried out in a membrane separation station 41. The retentate 32 is heated to about 115° C. by two heat exchangers 42, 43 and/or a top condenser of a first distillation column 44 and then fed into this first distillation column 44.

Beer mash concentrated in the first distillation column 44 is partly returned as bottom product 35 to the first distillation column 44 via a heat exchanger 45, so that the first distillation column 44 can be optimally operated (reboiler). Excess bottom product 35 is removed from the process.

The permeate 33 and the distillate 34 of the first distillation column 44 are fed together as a mixture 36 into a second distillation column 46.

In the second distillation column 46, a portion of the purified water is returned directly to the second distillation column 46 after evaporation in a heat exchanger 53 (reboiler), and excess water (water) 38 from the second distillation column 46 is removed via a heat exchanger 42. Another split stream 55 of the purified water is evaporated in a heat exchanger 52 and is then used as operating material of the second distillation column 46. In this regard, the heat exchanger 52 serves as a reboiler of the split stream 55 of purified water. The distillate 34 of the first distillation column 44 condenses in the process.

The mixture 36 of the distillate 34 of the first column 44 and the permeate 33 of the membrane separation station 41 of the feed 31 is fed at a high temperature (but as a liquid phase close to the boiling point) into the second distillation column 46 via a heat exchanger 54, especially a condenser, which is located directly before the column feed inlet 56. Excess heat resulting from the evaporation of the liquid in the first distillation column 44 can be removed from the process by the heat exchanger 54 and made available elsewhere.

A split stream 57 of the distillate of the second distillation column 46 is returned (reflux) to the second distillation column, while the main stream is fed into a group 47 of membrane modules 48-50 through a superheater 51.

The membrane modules 48-50 are again operated by a sweep technique. For this purpose, a split stream of the retentate 39 that constitutes the final product is returned to each of the membrane filter modules 48-50, through which it flows as explained above, and is returned to the second distillation column 46 as a mixture 40 with the permeate that forms in the membrane modules 48-50.

What is claimed is:

1. A method of distillation of ethanol from a mash, comprising the steps of:
   feeding the mash into a first distillation column;
   feeding a distillate of the first distillation column to a second distillation column; and
   purifying the mash before the mash is fed into the first distillation column, the purifying being performed by a membrane separation process, wherein a permeate of the purifying of the mash is fed into the second distillation column and a ratio of a retentate of the purifying of the mash to a permeate of the purifying of the mash is between 1:1 and 1:8.

2. The method of claim 1, wherein the membrane separation process is a dynamic cross-flow membrane filtration process.

3. The method of claim 1, wherein the retentate of the purifying of the mash is fed into the first distillation column.

4. The method of claim 1, wherein the permeate of the purifying of the mash is mixed with the distillate of the first distillation column and fed into the second distillation column.

5. The method of claim 1, wherein the permeate of the purifying of the mash and the distillate of the first distillation column are fed separately into the second distillation column.

6. The method of claim 1, wherein a water portion of the permeate remains in liquid phase in the second distillation column.

7. The method of claim 1, wherein a distillate of the second distillation column has an ethanol concentration of 75-95 wt. %.

8. The method of claim 1, wherein a distillate of the second distillation column is purified by a plurality of parallel-connected membrane modules.

9. The method of claim 1, wherein heat of a final product or a bottom product of the second distillation column is used to preheat the retentate of the purifying of the mash.

10. The method of claim 1, wherein a feed inlet of the second distillation column is equipped with a heat exchanger.

11. The method of claim 1, wherein the second distillation column comprises two separate distillation columns.

12. The method of claim 1, wherein a distillate of the second distillation column is purified, and the distillate of the second distillation column is heated prior to being purified.

13. The method of claim 1, wherein a distillate of the second distillation column is purified.

14. A method of distillation of ethanol from a mash, comprising the steps of:
feeding the mash into a first distillation column;
feeding a distillate of the first distillation column to a second distillation column; and
purifying the mash before the mash is fed into the first distillation column, the purifying being performed by a membrane separation process;
wherein a permeate of the purifying of the mash is mixed with the distillate of the first distillation column and fed into the second distillation column and the mixed permeate and the distillate fed into the second distillation column is maintained in liquid phase at a boiling point.

15. The method of claim 14, wherein a ratio of a retentate of the purifying of the mash to the permeate of the purifying of the mash is between 1:1 and 1:8.

16. A method of distillation of ethanol from a mash, comprising the steps of:
feeding the mash into a first distillation column;
feeding a distillate of the first distillation column to a second distillation column; and
purifying the mash before the mash is fed into the first distillation column, the purifying being performed by a membrane separation process;
wherein a permeate of the purifying of the mash and the distillate of the first distillation column are fed separately into the second distillation column and the permeate and the distillate that are fed separately into the second distillation column are maintained in liquid phase at a boiling point.

17. A method of distillation of ethanol from a mash, comprising the steps of:
feeding the mash into a first distillation column;
feeding a distillate of the first distillation column to a second distillation column; and
purifying a distillate from the second distillation column, the purifying being performed by a membrane separation process;
wherein the membrane separation process employs a plurality of parallel-connected membrane modules and the distillate of the second distillation column is purified and is heated prior to being purified by the membrane separation process.

18. The method of claim 17, wherein the mash is purified before the mash is fed into the first distillation column, and a permeate of the purifying of the mash is fed into the second distillation column.

19. A method of distillation of ethanol from a mash, comprising the steps of:
feeding the mash into a first distillation column;
feeding a distillate of the first distillation column to a second distillation column; and
purifying a distillate from the second distillation column, the purifying being performed by a membrane separation process;
wherein the membrane separation process employs a plurality of parallel-connected membrane modules and a portion of a retentate of the membrane modules is returned to each of the membrane modules as a flushing stream at a permeate side, and wherein after the portion of the retentate has passed through the membrane modules, the passed retentate is fed as a mixture with a permeate that forms in the second distillation column as a feed stream.

20. A method of distillation of ethanol from a mash, comprising the steps of:
feeding the mash into a first distillation column;
feeding a distillate of the first distillation column to a second distillation column; and
purifying a distillate from the second distillation column, the purifying being performed by a membrane separation process;
wherein the membrane separation process employs a plurality of parallel-connected membrane modules and a permeate of the membrane modules is preheated by heat of a bottom product removed from the second distillation column.

* * * * *